July 10, 1923.

G. L. A. FRIEDRICHS

FISH SHIPPING TANK

Filed July 3, 1922

1,461,350

INVENTOR
Gottfried L. A. Friedrichs
BY
W. T. Criswell
ATTORNEY

Patented July 10, 1923.

UNITED STATES PATENT OFFICE.

GOTTFRIED L. A. FRIEDRICHS, OF NEW YORK, N. Y.

FISH-SHIPPING TANK.

Application filed July 3, 1922. Serial No. 572,615.

*To all whom it may concern:*

Be it known that I, GOTTFRIED L. A. FRIEDRICHS, a citizen of the Republic of Germany, and a resident of New York, in the county of New York and State of New York, have invented certain new and useful Improvements in a Fish-Shipping Tank, of which the following is a full, clear, and exact specification.

This invention relates more particularly to a class of shipping containers.

My invention has for its object primarily to provide a tank designed to be employed for enabling fish, especially when alive, to be transported to distant localities in railroad cars, auto trucks and other vehicles without danger of being killed or injured during transit, and which is accomplished mainly by providing a substantially waterproof hollow body with an open top for holding a quantity of water in which living fish are placed for transportation. The body is preferably made of canvas or other flexible material so that the fish will not be injured by contact therewith while in transit, and spaced flexible line elements may be removably laced across the open top of the body to keep the fish within the body, while on the walls of the body may also be provided means to allow the body and fish to be held in suspension for preventing their contact with the vehicle when traveling.

A further object of the invention is to provide a fish shipping tank of a simple, efficient and durable construction which may be made in any appropriate shape and size.

With these and other objects in view, the invention will be hereinafter more fully described with reference to the accompanying drawing forming a part of this specification in which similar characters of reference indicate corresponding parts in all the views, and will then be pointed out in the claims at the end of the description.

Figure 1:
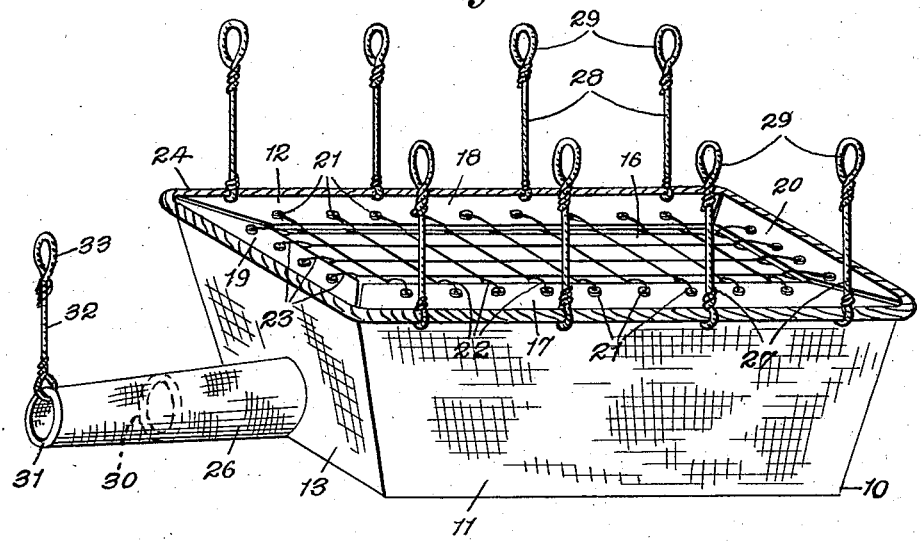
Figure 2:
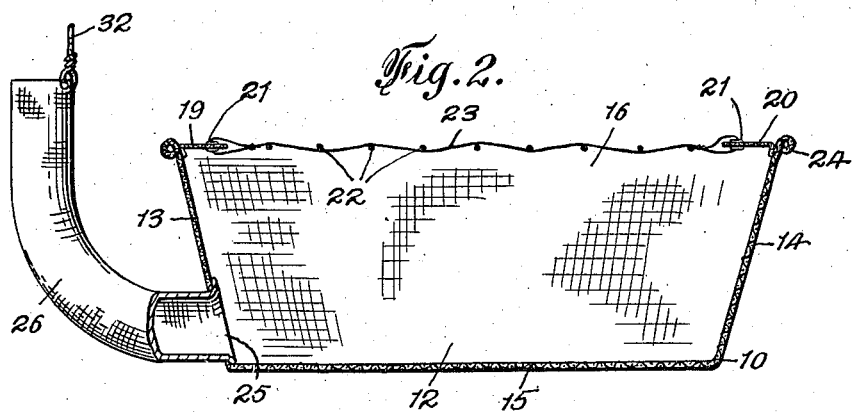

In the drawing, Figure 1 is a perspective view, partly fragmentary, of one form of shipping tank embodying my invention, and Fig. 2 is a sectional view taken longitudinally through the tank, part of which is shown in elevation.

The tank has a hollow body 10 which may be of any suitable size and shape, though the form of the body illustrated is substantially rectangular to provide side walls 11, 12, end walls 13, 14, a bottom 15, and an open top 16. Extending from the upper edges of the side walls and end walls of the body 10 crosswise of the open top 16 may be flanges or flaps, as 17, 18, 19, 20 all of which are of widths so that their free edges are in spaced relation, and in the flanges at their free edges may be spaced openings or eyelets 21. In the eyelets of the side flanges 17 and 18 may be removably laced line elements 22, and in the eyelets of the end flanges 19 and 20 may be removably laced other line elements 23 which are disposed across the line elements 22. The body 10 and the flanges 17, 18, 19, 20 are made of canvas or other flexible substantially waterproof material so that the body will hold water without tending to leak and so that when live fish are placed in the water in the body they will not be liable to injury from contact with the walls of the body. The line elements 22 and 23 are preferably made of rope, and stitched or otherwise fastened on the exterior of the flexible body at the intersection of its walls with the flanges 17, 18, 19, 20 is a rope or line 24 which surrounds the body.

When live fish are placed in a quantity of water provided in the body 10 the flanges 17, 18, 19, 20 and the line elements 22, 23 serve to prevent the fish from flopping through the open top of the body, and the flanges further serve to prevent the water from splashing over the side walls of the body especially when the tank and fish are transported to distant localities.

In the end wall 19 at the bottom 15 of the body may be an opening 25 for serving as an outlet to allow the water to be discharged from the body when desired, and extending from this end wall of the body is a chute 26 which is preferably of a tubular form provided so that it surrounds the outlet 25 for carrying the discharged water to a distant place from the body. The chute 26 is also preferably made of canvas or other waterproof flexible material, and this chute may be longer than the height of the body so that when bent upwardly, as shown in Fig. 2, its free open end will be above the body to prevent the water in the body from being accidentally discharged through the chute.

To the rope 24 at spaced parts of the side walls 17 and 18 of the body are fastened the lower ends of line elements or ropes, as 27 and 28, each having on its upper end a loop, as 27. Interiorly of the chute 26 at its free end and at its central parts may be provided stiffening bands or rings 30 and 31 to hold the flexible chute in circular form, and to the free end of the chute may be fastened one end of a line 32 having on its other end a loop 23. When the tank with a number of live fish in its body is arranged in a railway car or like vehicle for transportation the body and chute with the fish and water are suspended by the loops 29 of the ropes 27, 28 being removably hung to hooks provided interiorly of the car so that the body is spaced from the walls, bottom and roof of the car, and the loop 33 of the line 32 of the chute 26 is also hung to a hook so that its free end is positioned above the open top of the body. The fish may then be transported without liability of being injured by the jolts of the travelling car.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. A fish shipping tank, comprising a substantially rectangular flexible waterproof hollow body with an open top and having an outlet in its lower part, a flexible chute extending from the edge of the outlet opening of the body and the chute being longer than the height of the body, and means on the upper edges of the walls of the body whereby the body may be removably suspended to a support.

2. A fish shipping tank, comprising a substantially rectangular flexible waterproof hollow body with an open top, protective flanges extending from the walls of the body crosswise of its open top in spaced relation, spaced line elements removably laced to the flanges across the open top of the body, and means on the upper edges of the walls of the body whereby the body may be removably suspended to a support.

3. A fish shipping tank, comprising a substantially rectangular flexible waterproof hollow body with an open top and having an outlet opening in its lower part, protective flanges extending from the walls of the body crosswise of its open top in spaced relation, spaced line elements removably laced to the flanges across the open top of the body, and a flexible tubular chute extending from the edge of the outlet opening of the body and the chute being longer than the height of the body.

4. A fish shipping tank, comprising a substantially rectangular flexible waterproof hollow body with an open top and having an outlet opening in its lower part, protective flanges extending from the walls of the body crosswise of its open top in spaced relation, spaced line elements removably laced to the flanges across the open top of the body, a flexible tubular chute extending from the edge of the outlet opening of the body and the chute being longer than the height of the body, spaced loop elements on the upper edges of the walls of the body, and means on the chute whereby the chute may be removably supported so that its free end is above the body.

This specification signed and witnessed this 1st day of July, A. D. 1922.

GOTTFRIED L. A. FRIEDRICHS.

Witnesses:
D. MAGUIRE,
J. FREDERICK CRYER.